Patented Jan. 6, 1925.

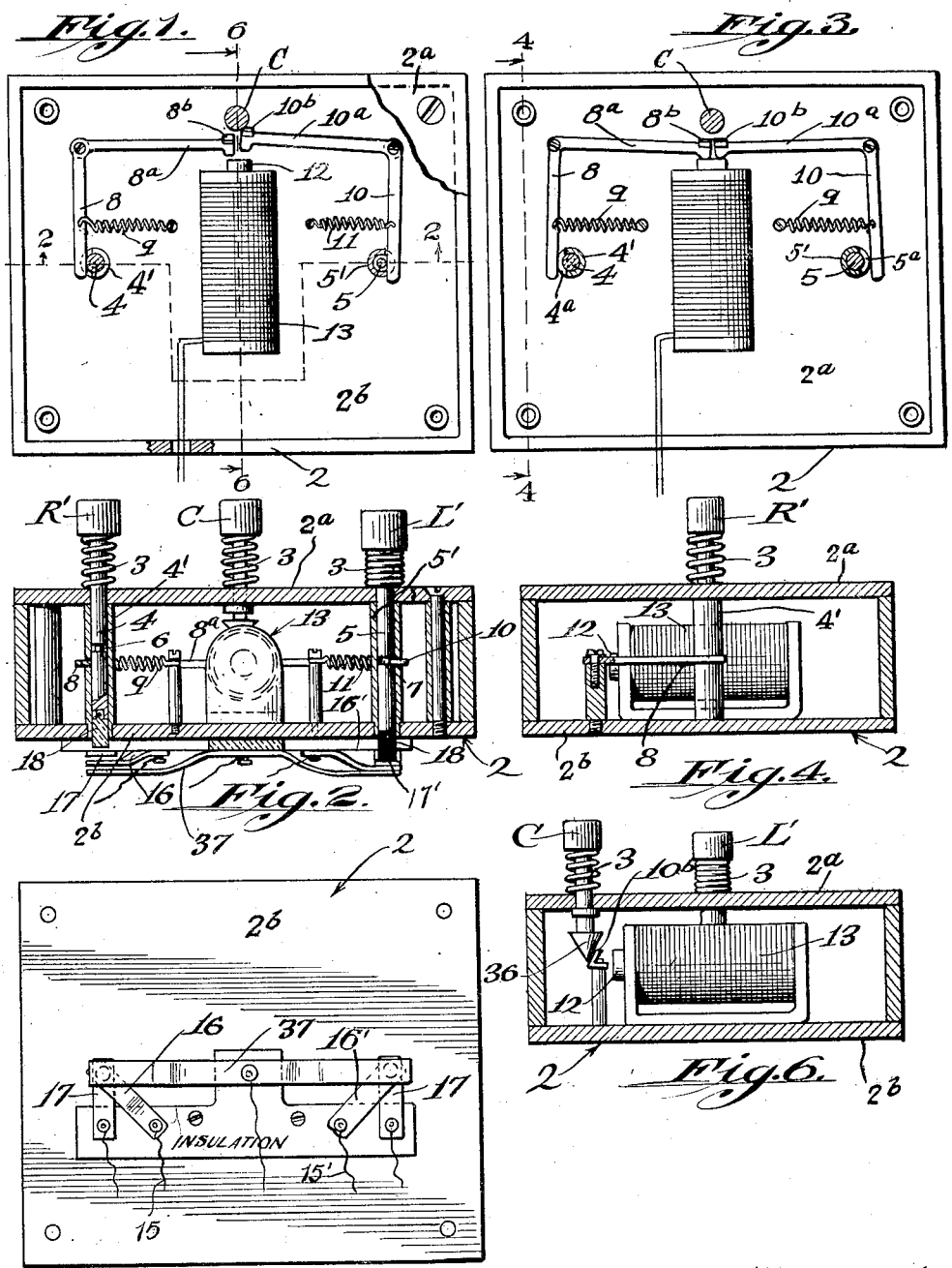

1,522,208

UNITED STATES PATENT OFFICE.

WILLIAM RUKSTELIS, OF LOS ANGELES, CALIFORNIA, ASSIGNOR OF ONE-HALF TO MIKE MILUSA, OF LOS ANGELES, CALIFORNIA.

TRAFFIC SIGNAL.

Application filed June 7, 1923. Serial No. 643,918.

*To all whom it may concern:*

Be it known that I, WILLIAM RUKSTELIS, a citizen of Lithuania, residing at Los Angeles, in the county of Los Angeles and State of California, have invented new and useful Improvements in Traffic Signals, of which the following is a specification.

This invention relates to signals for road vehicles and more particularly for motor vehicles.

An object of the invention is to provide a signal apparatus including independent right and left hand turn indicating signals that are adapted to be set by hand and that are adapted to be automatically broken at the completion of the turn of the vehicle through operation of the steering mechanism. Another object is to provide a manual cut-out device for cancelling a previously set signal, in the event that the proposed turn has not been manœuvered.

Other objects and advantages will be made manifest in the following specification of an embodiment of the invention illustrated in the accompanying drawings, wherein—

Fig. 1 is a plan of parts of the signal mechanism as arranged in a box, the cover of which is broken away.

Fig. 2 is a cross section on line 2—2 of Figure 1.

Fig. 3 is a plan showing the mechanism of Figure 1 in tripping position.

Fig. 4 is a cross section on line 4—4 of Figure 3.

Fig. 5 is a bottom plan of the device of Figure 2.

Fig. 6 is a sectional view on line 6—6 of Figure 1 showing the manual cut-out device.

The apparatus includes a set of signal lights which, when respectively energized, are designed to indicate respectively a right hand and a left hand turn. Means are provided for energizing either signal light under manual control, and means are also provided for automatically breaking the energizing circuit of the set signal by operation of the steering means of a vehicle to which the signals may be applied.

The control means of the apparatus may be enclosed in and mounted on a suitable box 2 from the face of which projects a right hand turn button R′ and a left hand turn button L′, and also a cancellation or cut-out button C. Sleeves 4′ and 5′ are inserted between the bottom 2$^b$ and the top 2$^a$ and have notches 4$^a$ and 5$^a$. These buttons are each yieldingly held in outer position as by springs 3. The buttons R′ and L′ have respective push rods 4 and 5 which are each provided with respective notches or grooves 6 and 7. The push rods 4 and 5 slide in sleeves 4′ and 5′ and the notches 6 and 7 in the push rods are adapted to register with the notches 4$^a$ and 5$^a$ in the sleeves. Mounted within the box 2 is a set of bell cranks, one of which has an arm 8, normally pulled by a spring 9 into the slot 4$^a$ against the contiguous push rod 4, and the other of which has an arm 10 drawn by a spring 11 into the slot 5$^a$ against the push rod 5. The arms 8 and 10 rest in the slots 4$^a$ and 5$^a$ all the time and this prevents the arms from vibrating up or down. The bell crank arm 8 is combined with an arm 8$^a$, and the bell crank arm 10 is combined with an arm 10$^a$, and these arms reach toward each other and carry respective armatures 8$^b$ and 10$^b$, disposed opposite to the core 12 of an electromagnet 13 mounted in the box 2.

Thus it will be seen that when either button R′ or L′ is pushed downwardly, the slot or groove of its push rod is engaged by the respective locking arm 8 or 10 and therefore the push rod and button are held depressed against the reacting springs 3. The push buttons R′ and L′ form means for closing respective electric circuits for the signal lights, and these circuits include a common battery, from which leads a wire having branches 15 and 15′, connected to respective flexible contacts 16 and 16′ overlapping and normally spaced below depressible contacts 17 and 17′, disposed below the lower ends of the plungers 4 and 5, which lower ends are provided with insulating blocks 18. The contact 17 is electrically connected to the right hand signal light, and this is connected by a ground line to the metal structure or frame of the vehicle, this ground being connected by a common lead wire to the battery.

The contact 17′ is electrically connected to its respective left hand signal light, and this is grounded by wire to the ground or frame. It will therefore be apparent that when either push button R′ or L′ is depressed, it will close the proper signal circuit and the signal light will be energized. The energized circuit will be held closed by the depressed plunger under control of the latch arm 8 or 10, as the case may be, and means are provided for automatically breaking the energized signalling circuit at the completion of the turn of the vehicle.

This automatic means is combined with the lever arm of the steering mechanism, and which is connected to the drag link so that as the arm returns to a normal, straight driving position, it will become effective to break the energized signal circuit. A form of circuit breaking means includes a lever arm forked or slotted to receive the drag lever, and is secured on a rock shaft. To provide for quick action, there is secured on the rock shaft a segment of a gear, engaging a pinion, fixed on a rock shaft on which is secured a finger 30.

In the neutral or normal position of the finger, it stands between a pair of yieldingly mounted dogs which are adapted to yield in two directions, this being made possible by tensioned springs connected to the dogs. These dogs are electrically connected to a common wire, leading to the electromagnet 13. In operation, the finger moves in either direction from its neutral position and will engage one or the other of the dogs, which are provided with insulating portions, presented toward the finger as it moves from its neutral or intermediate position. The swinging finger will engage the insulating medium of the dog and the latter will be pressed with the movement of the finger until the end of the finger clears the dog, and this will then snap back into its normal position without closing the circuit in the line to the electromagnet 13.

Upon the return movement of the finger to its neutral position, as when the vehicle is running straight, the finger then comes into electrical contact with the exposed face of the engaged dog, and the circuit is completed through the wire to the electromagnet 13, thence by a wire to a contact member having ends disposed contiguous to the contacts 16—17, and to the contacts 16'—17'; the circuit being completed from the electromagnet through the battery wires 15 or 15' to the battery.

Through the energization of the electromagnet 13, the armatures 8$^b$ and 10$^b$ are both attracted, and whichever of the armatures is connected to the arm 8 or arm 10 that may be in latching engagement with the depressed button push rod 4 or 5 will therefore serve to trip the effective latch arm and release the engaged push rod, whereupon the released push rod and its button L' or R' will be thrown to normal position and thus break the circuit at the contact 16—17 or 16'—17'.

For instance, as shown in Figures 1 and 2, the latch arm 10 is in restraining engagement with the push rod 5 of the left hand turn signal button L'. After the completion of the left hand turn, the finger is restored to an intermediate position, and during such restoration one of the dogs 30—30$^a$ is engaged and the electromagnet 13 is energized and the latching arm 10 is turned by the attraction of its armature 10$^b$ to release the rod 5.

In the event that one of the signal circuits has been closed, for making a signal of a proposed turn and such turn is not completed, the energized circuit may be broken by the operation of the cut-out button C, Figures 2 and 6. As this button is depressed, it moves a tripper 36 into engagement with the contiguous, outwardly thrust arm 8$^b$ or 10$^b$, as the case may be, and this is pressed toward the pole of the electromagnet 13 and thus its latching arm is disengaged from its push rod and the latter will be released and the closed circuit broken.

Further embodiments, modifications and variations may be resorted to within the principle of the invention.

What is claimed is:

1. A switch for traffic signals, comprising a box having an upper plate and a lower plate spaced apart, two sleeves between the upper and lower plates and having notches, push rods slidingly mounted in the sleeves and having notches adapted to register with the notches in the sleeves, expansion springs upon the upper ends of the push rods against the upper plate, buttons fixed upon the upper ends of the push rods against the springs, an electro-magnet mounted between the sleeves, bell crank levers mounted upon pivots at their angles, corresponding arms of said bell crank levers fitting in the notches in the sleeves, springs connected to said arms to pull the arms into the notches, the other ends of the bell crank levers being adjacent the end of the electro-magnet, armatures upon these ends of the bell crank levers to be operated by the magnet so that when the buttons are operated to press the push rods outwardly the arms of the bell crank levers will snap into the notches of the push rods and hold the push rods and thereby moving the armatures away from the magnet and a third push rod mounted through the top of the box and having a beveled lower end to engage the armatures so that when the third push rod is pressed outwardly the bell crank levers will be swung upon their pivots out of the notches of the push rods thereby releasing the push rods.

2. In a switch for traffic signals, a box having upper and lower plates spaced apart, push rods mounted to extend through the plates, springs upon the push rods against the upper plate, and buttons upon the push rods against the springs, insulating blocks upon the lower ends of the push rods, an insulating block against the bottom of the box, two flexible spring contacts mounted at one end of the insulation block with their free ends spaced one above the other and in position to be engaged by one push rod, two flexible spring contacts secured at the other end of the insulation block with their free ends spaced one above the other in line with the other push rod, a contact member mounted upon the insulation block with its ends extending under the ends of the pairs of contact members and spaced therefrom so that when a push button is depressed the corresponding contact members are brought together.

3. A switch for traffic signals, comprising a box having an upper plate and a lower plate spaced apart, two sleeves between the upper and lower plates and having notches, first and second push rods slidingly mounted in the sleeves and having notches adapted to register with the notches in the sleeves, springs for holding the push rods normally elevated, an electro-magnet mounted between the sleeves, bell crank levers mounted upon pivots at their angles, corresponding arms of said bell crank levers fitting in the notches in the sleeves, springs connected to said arms to pull the arms into the notches, the other ends of the bell crank levers being adjacent the end of the core of the electro-magnet, armatures upon these ends of the bell crank levers, to be operated by the magnet so that when the push rods are moved downwardly the arms of the bell crank levers will snap into the notches of the push rod and move the armatures away from the magnet, a third push rod mounted through the top of the box and having a bevelled lower end to engage the armatures, so that when the third push rod is pressed downwardly the bell crank levers will be swung upon their pivots out of the notches of the push rods, thereby releasing the push rods, and so that when the electro-magnet is energized the armatures will be pulled to the core and the bell crank levers will be swung upon the pivots out of the notches of the push rod, thereby releasing the push rod, insulating blocks upon the lower ends of the push rods, an insulating block against the bottom of the box, two flexible spring contacts mounted at one end of the insulating block with their free ends spaced one above the other and in position to be engaged by one push rod, a second two flexible spring contacts secured at the other end of the insulation block with their free ends spaced one above the other in line with the second push rod, a fifth contact member mounted upon the insulation block with its ends extending under the ends of the first and second pairs of contact members and spaced therefrom, so that when either push rod is moved downwardly corresponding contact members are brought together and the push rod held by the bell crank levers until the electro-magnet is energized, or the third push rod manually operated.

In testimony whereof I have signed my name to this specification.

WILLIAM RUKSTELIS.